United States Patent
Low

(10) Patent No.: US 7,347,893 B2
(45) Date of Patent: Mar. 25, 2008

(54) IRON OXIDE PIGMENTS FROM MILL SCALE

(75) Inventor: Kin Onn Low, Selangor Darul Ehsan (MY)

(73) Assignee: IOP Specialists SDN. BHD., Selangor Darul Ehsan (MY)

( * ) Notice: Subject to any disclaimer, the term of this patent is extended or adjusted under 35 U.S.C. 154(b) by 0 days.

(21) Appl. No.: 11/445,204

(22) Filed: Jun. 2, 2006

(65) Prior Publication Data

US 2007/0277703 A1    Dec. 6, 2007

(51) Int. Cl.
*C09C 1/24* (2006.01)
*C09C 3/00* (2006.01)
*C09C 3/04* (2006.01)
*C01G 49/02* (2006.01)

(52) U.S. Cl. ............... 106/456; 106/453; 106/459; 106/460; 423/594.1; 423/594.2; 423/632; 423/633

(58) Field of Classification Search ............... 106/456, 106/453, 459, 460; 423/632, 633, 594
See application file for complete search history.

(56) References Cited

U.S. PATENT DOCUMENTS

| 4,086,321 | A | * | 4/1978 | Holley et al. ............. 423/150.3 |
| 4,289,746 | A | * | 9/1981 | Hayakawa et al. ......... 423/633 |
| 5,738,717 | A | * | 4/1998 | Oulsnam et al. ............ 106/456 |
| 6,086,846 | A | * | 7/2000 | Burow et al. ............... 423/632 |
| 6,302,952 | B1 | * | 10/2001 | Mobbs et al. ............... 106/456 |
| 6,503,315 | B1 | * | 1/2003 | Etzenbach et al. .......... 106/456 |
| 6,530,987 | B1 | * | 3/2003 | Auer et al. ................. 106/456 |
| 6,638,618 | B2 | * | 10/2003 | Hayashi et al. ............. 428/402 |
| 6,689,206 | B2 | * | 2/2004 | Meisen ....................... 106/456 |

FOREIGN PATENT DOCUMENTS

JP    2-26834 A    *    1/1990

* cited by examiner

*Primary Examiner*—Anthony J. Green
(74) *Attorney, Agent, or Firm*—Birch, Stewart, Kolasch & Birch, LLP

(57) ABSTRACT

The current invention relates to a method of manufacturing iron oxide pigments from mill scale. The mill scale is mixed with alien iron oxide and the resultant mixture is heated to a temperature of 200° C. to 900° C. in an oxidizing atmosphere to produce iron oxide pigment which can be black, brown or red. The alien iron oxide used and the iron oxide pigment produced are predominantly $Fe_2O_3$ or $Fe_3O_4$ or a mixture of both. The iron oxide pigment produced as above or from any other sources can be turn into black by mixing it with mill scale and the resultant mixture is heated to a temperature of 200° C. to 900° C. in a non-oxidizing or reducing atmosphere to produced iron oxide black pigment. Additives can be added to produce better quality iron oxide black pigment. The additives can be chromium oxide or manganese oxide or magnesium oxide or any carbonaceous material or mixtures thereof. The iron oxide black pigment produced as above is cooled in a non-oxidizing or reducing atmosphere to ensure no re-oxidation.

8 Claims, No Drawings

IRON OXIDE PIGMENTS FROM MILL SCALE

The present invention relates to the production of iron oxide pigments. More particularly this invention relates to the production of iron oxide pigments from mill scale.

Iron oxide pigments depending on their chemical composition and crystal structures maybe yellow, orange, red, brown or black in colour. Iron oxide pigments are suitable for use as: colouring agent in paints, ceramics, rubber and plastics, paint pigments, body stains, bricks, tiles, porcelain enamels, glazes, glass, pet food, face powder, pharmaceutical capsules as well as toners for printing applications.

Synthetic iron oxide pigments are conventionally prepared by the reaction of iron salts with alkalis, as disclosed in U.S. Pat. No. 1,327,061 by Penniman et al. Many other improvements and further work have been done based on the Penniman work.

Another major method of iron oxide synthesis for pigment application is the Laux process utilizing iron oxide derived from the so-called nitro-benzene process. There are many improvements to the Laux process, one such work is described by Westerhaus et al. in U.S. Pat. No. 4,966,641. These two major processes use acids and alkalis. The synthesis process become expensive and is relatively difficult to handle when chemicals are involved. This does not only increase the cost of raw material but the equipment and consumables are relatively expensive. This leads to high processing cost and eventually the trade price of synthetic iron oxide pigments become relatively expensive.

Another major synthetic iron oxide production technology is based on spray pyrolysis of iron chloride or iron sulphate solution. References of such work can be found in U.S. Pat. Nos. 5,911,967 and 5,200,159. The iron oxide produced in this way is called ferric oxide, which is suitable as raw material for ferrites. Such ferric oxide is red colour but it is not commonly used as a colouring pigment. The main object of the technology described in the two US patents is actually means to manage the acid waste, which is the by-product of pickling process involved in the steel industry.

Having discussed the above processes of iron oxide synthesis, one may find that these are chemical processes, involving relatively expensive raw materials as well as expensive equipment. In recent years, the industry has started to be aware of the importance of utilizing mill scale as the raw material to synthesize iron oxide pigment. Mill scale is the ferrous oxide scale commonly available and produced when steel billet or structures are hot and go through the so-called hot-working process in steel mills and steel structure companies. Mill scale may be obtained from other iron and steel plant sources as well.

Pfizer & Co. (Pat. No. GB1,090,043) employed a combination of mill scale and iron sulphate as raw materials for iron oxide pigment production. The major disadvantage of such process is that, a highly corrosive chemical, iron sulphate is employed, which process is similar to those chemical processes previously discussed.

In early 1990s, Yang et al. (Pat. No. CN1,049,169) calcined mill scale with carbonaceous material under a non-oxidizing environment to process black iron oxide. A related work has been reported in U.S. Pat. No. 5,738,717 where mill scale was used directly without the use of costly chemicals in the processing of iron oxide pigments. In this work, major processing steps involve calcinations of mill scale. This work describes that red, brown and black iron oxide can be obtained. However, many industrial practical difficulties are involved, such as the controllability of process for colour consistency. Also, the process reaction velocity to obtain iron oxide pigments may not be practical because direct oxidation of mill scale is slow. The control of oxidation process in the formation of red and black oxide was not fully disclosed.

The current invention relates to a method of manufacturing iron oxide pigments from mill scale. The mill scale is mixed with alien iron oxide and the resultant mixture is heated to a temperature of 200° C. to 900° C. in an oxidizing atmosphere to produce iron oxide pigment which can be black, brown or red. The alien iron oxide used and the iron oxide pigment produced are predominantly $Fe_2O_3$ or $Fe_3O_4$ or a mixture of both. The iron oxide pigment produced as above or from any other sources can be turn into black by mixing it with mill scale and the resultant mixture is heated to a temperature of 200° C. to 900° C. in a non-oxidizing or reducing atmosphere to produced iron oxide black pigment. Additives can be added to produce better quality iron oxide black pigment. The additives can be chromium oxide or manganese oxide or magnesium oxide or any carbonaceous material or mixtures thereof. The iron oxide black pigment produced as above is cooled in a non-oxidizing or reducing atmosphere to ensure no re-oxidation.

A mixture of mill scale and iron oxide (predominantly $Fe_2O_3$ or $Fe_3O_4$ or a mixture of both) from an external source (herein after referred to as alien iron oxide) is subjected to oxidation. The mixture is heated to a temperature between 200° C. to 900° C. in the presence of oxygen. The presence of alien iron oxide accelerates the oxidation of mill scale. The amount of alien iron oxide needed and the heating period of the mixture depend on the nature, quality and fineness of the mill scale used and also on the degree of oxidation desired. The finer the mill scale, the bigger the contact surface between mill scale and iron oxide, thus the lesser amount of alien iron oxide needed and the shorter the heating period. The higher the degree of oxidation desired, the more amount of alien iron oxide is needed and the longer the heating period. The iron oxide pigment produced (predominantly $Fe_2O_3$ or $Fe_3O_4$ or a mixture of both) may be black, brown or red depending on the degree of oxidation. Iron oxide red pigment is produced when full oxidation has occurred. On the other hand, iron oxide black pigment is produced when the oxidation process is not complete. For a higher degree of oxidation, surface of exposure of the mixture must be large. Any means for increasing the surface of exposure such as using a stirring device while heating the mixture can be utilized.

(i)

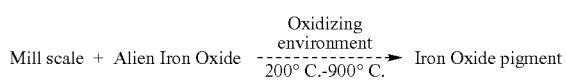

Mill scale + Alien Iron Oxide $\xrightarrow[200° C.-900° C.]{\text{Oxidizing environment}}$ Iron Oxide pigment Iron oxide pigment (predominantly $Fe_2O_3$ or $Fe_3O_4$ or a mixture of both) from reaction (i) or any other source can be turned into black pigment by mixing it with mill scale and subjecting the mixture to reduction. The mixture is heated to a temperature between 200° C. to 900° C. in a non-oxidizing or reducing atmosphere. Mill scale acts as a reducing agent whereby the final product is iron oxide black pigment (predominantly $Fe_3O_4$). The amount of mill scale needed and the heating period of the mixture depend on the nature, quality and fineness of the iron oxide pigment and the mill scale used. The more the intensity of redness of the iron oxide pigment used, the more the amount of mill scale needed and the longer the heating period. The finer the iron oxide pigment and the mill scale used, the bigger the contact surface between iron oxide pigment and mill scale, thus the lesser amount of mill scale needed and the shorter the heating period.

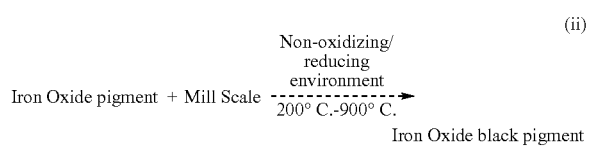

(ii)

Additives can be added in reaction (ii) to produce better quality iron oxide black pigment. The additives can be chromium oxide or manganese oxide or magnesium oxide or any carbonaceous material or mixtures thereof. The amount of additives needed depends on the nature, quality and fineness of the additives, the iron oxide pigment and the mill scale used. The finer the additives, the iron oxide pigment and the mill scale used, the bigger the contact surface between additives, iron oxide pigment and mill scale, thus the lesser the amount of additives needed. The resultant iron oxide black pigment from reaction (ii) is left to cool while still under the non-oxidizing or reducing environment to ensure no re-oxidation.

The following examples are provided by way of illustration and should not be interpreted as limiting the invention.

EXAMPLE 1

Spray roasted red ferric oxide (3 kg) is mixed with pulverized mill scale (6 kg) of a fineness less than 50 microns. The mixture is heated to a temperature of 450° C. for 3 hours in a tubular rotary furnace with a hole on one door to allow free-flow of air. The desired degree of oxidation is achieved. A brownish black iron oxide is obtained and it is ball milled to achieve satisfactory pigment quality with good tinting strength.

EXAMPLE 2

The procedure of Example 1 is repeated wherein the spray roasted red ferric oxide is substituted with brownish black iron oxide obtained from Example 1 and substantially the same result is obtained.

EXAMPLE 3

Brownish black iron oxide (6 kg) obtained from Example 2 is mixed with pulverized mill scale (300 g) of a fineness less than 50 microns. The mixture is heated to a temperature of 550° C. in a chamber with purging nitrogen gas for 2 hours. Then, the mixture is left to cool under non-oxidizing atmosphere for 15 hours. A black iron oxide is obtained and it is ball milled to achieve satisfactory pigment quality with good tinting strength. The colour intensity values tested using Minolta Chroma meter CR-210 are typically L=32.46, a=1.38 and b=−2.54.

EXAMPLE 4

Spray roasted red ferric oxide (1.5 kg) is mixed with coarser mill scale (9 kg) of a fineness between 250 microns to 600 microns. Coarser mill scale is chosen here to facilitate the separation of excess mill scale from final product (which is black iron oxide) so that the final product would be in a purer form. The mixture is heated to a temperature of 550° C. for 2 hours in an internal stirring chamber furnace with purging nitrogen gas. Then, the mixture is left to cool under non-oxidizing atmosphere for 15 hours. The desired black iron oxide is obtained by sifting the resultant mixture to separate out excess mill scale. The black iron oxide obtained is ball milled to achieve satisfactory pigment quality with good tinting strength.

EXAMPLE 5

The procedure of Example 4 is repeated wherein the spray roasted red ferric oxide is substituted with red iron oxide, a by-product of $TiO_2$ production process and substantially the same result is obtained.

EXAMPLE 6

The procedure of Example 4 is repeated wherein the spray roasted red ferric oxide is substituted with brownish black iron oxide obtained from Example 2 and substantially the same result is obtained.

EXAMPLE 7

Black iron oxide (6 kg) obtained from Example 3 is mixed with manganese oxide (180 g) and pulverized charcoal (180 g). The mixture is heated to a temperature of 500° C. in a chamber with purging nitrogen gas for 2 hours. Then, the mixture is left to cool under non-oxidizing atmosphere for 15 hours. A darker black iron oxide is obtained. Mill scale is not added here because the black iron pigment obtained from Example 3 already contains excess mill scale. The colour intensity values tested using Minolta Chroma meter CR-210 are typically L=31.35, a=1.30 and b=−2.56.

EXAMPLE 8

Brownish black iron oxide (6 kg) obtained from Example 2 is heated to a temperature of 550° C. in a chamber with purging nitrogen gas for 2 hours. Then, the resultant is left to cool under non-oxidizing atmosphere for 15 hours. A black iron oxide is obtained and it is ball milled to achieve satisfactory pigment quality with good tinting strength. Mill scale is not added here because the brownish black iron oxide obtained from Example 2 already contains excess mill scale. The colour intensity values tested using Minolta Chroma meter CR-210 are typically L=32.53, a=1.89 and b=−2.63.

The invention claimed is:

1. A method of manufacturing iron oxide pigments from mill scale comprising the stages of
   (i) mixing iron oxide with mill scale;
   (ii) heating the mixture from (i) to a temperature of 200° C. to 900° C.;
   (iii) cooling the mixture from (ii).

2. A method of manufacturing iron oxide pigments as claimed in claim 1 wherein the stages of (ii) and (iii) are done in
   a) an oxidizing atmosphere to produce iron oxide pigment of black, brown or red colour, or
   b) a non-oxidizing or reducing atmosphere to produce iron oxide black pigment.

3. A method of manufacturing iron oxide pigments as claimed in claim 1 wherein the iron oxide is predominantly $Fe_2O_3$ or $Fe_3O_4$ or a mixture of both.

4. A method of manufacturing iron oxide pigments as claimed in claim 2 wherein the oxidizing atmosphere comprises ordinary air or oxygen.

5. A method of manufacturing iron oxide pigments as claimed in claim 2 wherein the non-oxidizing or reducing atmosphere comprises steam, nitrogen, argon, carbon monoxide or carbon dioxide.

6. A method of manufacturing iron oxide pigments as claimed in claim 2 wherein the iron oxide pigment produced is predominantly $Fe_2O_3$ or $Fe_3O_4$ or a mixture of both.

7. A method of manufacturing iron oxide pigments as claimed in claim 2 wherein the iron oxide pigment produced is predominantly $Fe_3O_4$.

8. A method of manufacturing iron oxide black pigments as claimed in claim 2 wherein at least one or more additives selected from the group consisting of
   (i) chromium oxide
   (ii) manganese oxide
   (iii) magnesium oxide
   (iv) carbonaceous material
is added to the mixture.

* * * * *